(12) United States Patent
Payson et al.

(10) Patent No.: US 6,853,316 B2
(45) Date of Patent: Feb. 8, 2005

(54) INDUSTRIAL SWITCHING HUB FOR ETHERNET NETWORK

(75) Inventors: Brian D. Payson, Bolton, MA (US); Mark E. Fillion, Rumford, RI (US); Robert Neagle, Lake in the Hills, IL (US); Brad Woodman, Evanston, IL (US)

(73) Assignee: Woodhead Industries, Inc., Deerfield, IL (US)

( * ) Notice: Subject to any disclaimer, the term of this patent is extended or adjusted under 35 U.S.C. 154(b) by 370 days.

(21) Appl. No.: 09/933,298

(22) Filed: Aug. 20, 2001

(65) Prior Publication Data

US 2002/0025710 A1 Feb. 28, 2002

Related U.S. Application Data

(60) Provisional application No. 60/226,630, filed on Aug. 21, 2000.

(51) Int. Cl.[7] ............................................. G08G 1/123
(52) U.S. Cl. ..................... 340/999; 439/271; 710/317; 713/100
(58) Field of Search ........................ 340/999; 361/679, 361/728, 729, 730, 631; 439/606, 928.1, 532, 74, 271, 676, 344; 710/317, 301, 8, 70; 713/100; 379/93.07

(56) References Cited

U.S. PATENT DOCUMENTS

| | | | | |
|---|---|---|---|---|
| 5,439,386 A | * | 8/1995 | Ellis et al. ................... | 439/322 |
| D380,447 S | | 7/1997 | Chen et al. ................. | D13/164 |
| 6,074,247 A | * | 6/2000 | Hall et al. ................... | 439/532 |
| 6,085,241 A | | 7/2000 | Otis ........................... | 709/223 |
| 6,240,554 B1 | | 5/2001 | Fenouil ....................... | 725/105 |
| 6,435,911 B1 | * | 8/2002 | Payson et al. .............. | 439/606 |
| 6,570,965 B1 | * | 5/2003 | Isely et al. ................ | 379/93.07 |
| 6,595,791 B2 | * | 7/2003 | Below et al. ............... | 439/271 |

* cited by examiner

*Primary Examiner*—Brent A. Swarthout
(74) *Attorney, Agent, or Firm*—Emrich & Dithmar LLC

(57) ABSTRACT

An industrial Ethernet switching hub includes a casing in which a plurality of industrial Ethernet connector assemblies are mounted. Each Connector assembly includes a rigid connector receptacle sealed to the casing and receiving an Ethernet connector. The casing of each connector assembly has an externally threaded extension for receiving a mating Ethernet connector. A quick disconnect power connector is also mounted to the casing and a switch IC controller is embedded in the casing for data signal routing among the Ethernet connectors.

7 Claims, 6 Drawing Sheets

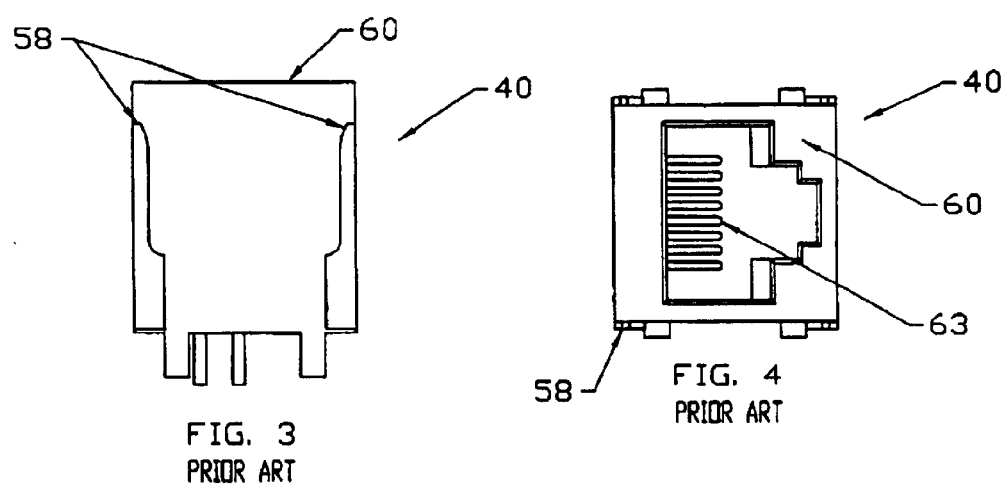
FIG. 3
PRIOR ART
FIG. 4
PRIOR ART
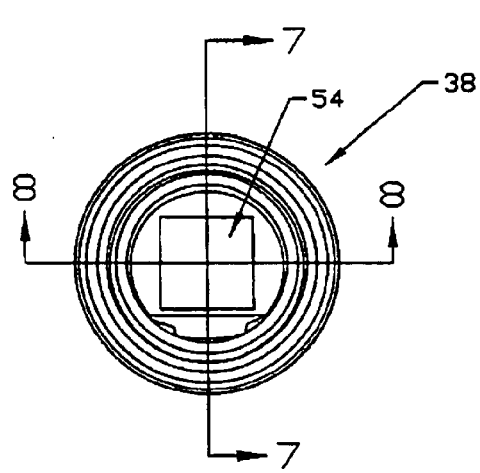
FIG. 5
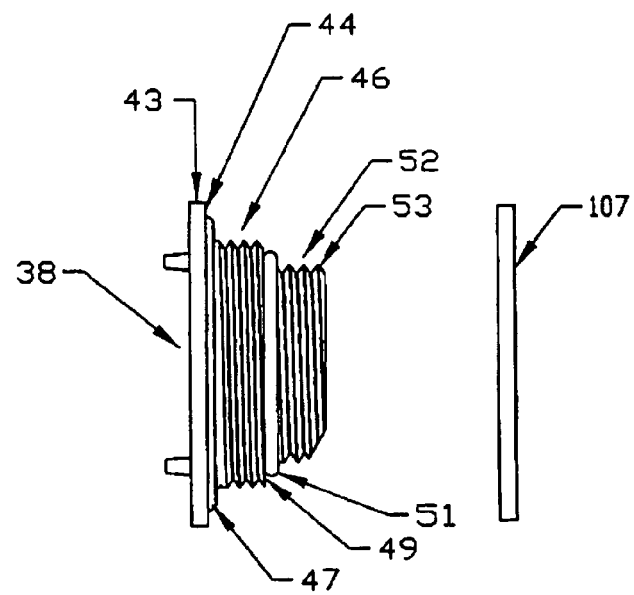
FIG. 6

US 6,853,316 B2

INDUSTRIAL SWITCHING HUB FOR ETHERNET NETWORK

RELATED APPLICATION

This application claims priority benefit under 35 U.S.C §120 of co-pending provisional application No. 60/226,630 filed Aug. 21, 2000.

FIELD OF THE INVENTION

The present invention relates to a switching hub for Ethernet networks; and more particularly, it relates to an Ethernet switching hub (or simply "switch") which is suitable for use in industrial environments such as in the manufacturing automation industry.

BACKGROUND OF THE INVENTION

The Ethernet network is widely used in office environments, engineering departments, and other business environments for data communications between local areas networks (LAN) and centralized data processors. However, recently, the Ethernet network has become more widely used in manufacturing environments which requires higher standards of protection for the various connectivity components, such as electrical connectors, that are used. Industrial connectors are stronger structurally, more durable, and more widely adapted to a rigorous use environment. For example, standards are typically implemented for meeting various specifications for operation in wet or dusty environments.

Thus, the present invention is directed to an industrial switching hub for an Ethernet network which has particular use in a programmable logic controller-based or PC-based control systems used in the manufacturing automation industry, although other uses in other environments will be appreciated by those skilled in the art.

SUMMARY OF THE INVENTION

The present invention includes a switch housing or casing having a plurality of individual RJ45 connectors, each of which is provided with a molded protective receptacle which is mounted to the main switch housing. Further, each connector receptacle includes a conventional RJ45 connector, such as are widely used in non-industrial Ethernet.

In addition, the device includes a conventional industrial quick-disconnect connector for coupling DC power to and from the local area network associated with the Ethernet switch. A switch IC controller is also housed in the switch housing for providing control functions necessary to implement the use of the industrial Ethernet connectors as data ports while avoiding collisions of data and insuring proper routing of data.

Other features and advantages of the present invention will be apparent to persons skilled in the art of the following detailed description of a preferred embodiment accompanied by the attached drawing, wherein identical reference numerals refer to like parts in the various views.

BRIEF DESCRIPTION OF THE DRAWINGS

FIG. 3 is a front elevational view of an RJ45 connector used in the hub of FIG. 1;

FIG. 4 is a side view of the RJ45 connector of FIG. 3;

FIG. 5 is a front view of an industrial connector receptacle for the RJ45 connector of FIG. 3;

FIG. 6 is a side view of the connector receptacle of FIG. 5;

DETAILED DESCRIPTION OF THE ILLUSTRATED EMBODIMENT

Figure 1:
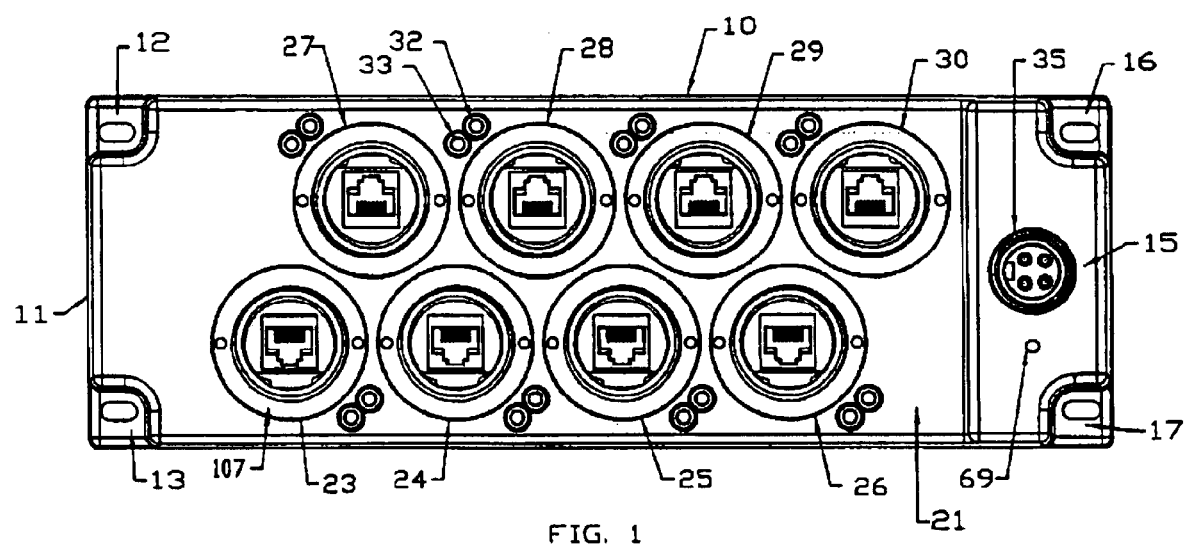
FIG. 1 is a top view of an Ethernet switch incorporating the present invention.

Referring first to FIG. 1, reference numeral 10 generally designates a switch housing or casing for an industrial Ethernet switching hub constructed according to the present invention. The switch housing 10 includes a left side pad 11 (see FIG. 2) which defines two apertured recesses 12, 13 for receiving threaded fasteners for mounting the switch housing to a panel or the like. The right side of the switch housing includes a pad 15 of increased height, also defining two recesses 16, 17 which are apertured to receive mounting screws.

Figure 2:
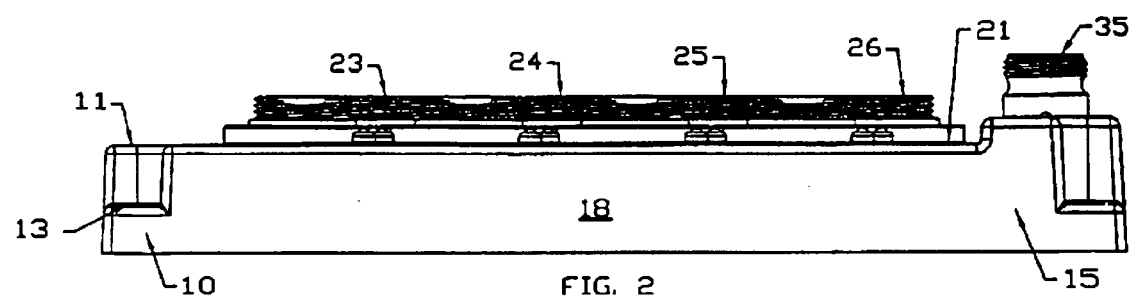
FIG. 2 is a side view of the Ethernet switch of FIG. 1.

The center portion of the switch housing 10, as best seen in FIG. 2, is of uniform height, level with the left side 11, as shown generally at 18 in FIG. 2 for housing a printed circuit board containing connections and a switch IC Controller, as will be described. The center portion 18 includes a top surface 21, seen in FIG. 1, which includes eight circular apertures for mounting eight separate industrial Ethernet connectors designated respectively 23–30.

In addition to the industrial Ethernet connectors 23–30, the top surface 21 includes for each of the connectors 23–30, a pair of visual indicators (LEDs) such as those designated 32, 33 for the industrial Ethernet connector 28. One of the LEDs, 32, is illuminated or not to indicate the transmission rate of the controller. For example, the LED 32 indicates the controller operating data rate. If the LED is lit, the system is operating at 100 megabytes (100 BASE-T), and when the LED 32 is off, it indicates that the data rate is 10 megabytes (10 BASE-T). When the LED 33 is on, it indicates that data is being transmitted, and when LED 33 is not illuminated, it indicates that no data is being transmitted for that particular port.

Figure 12:
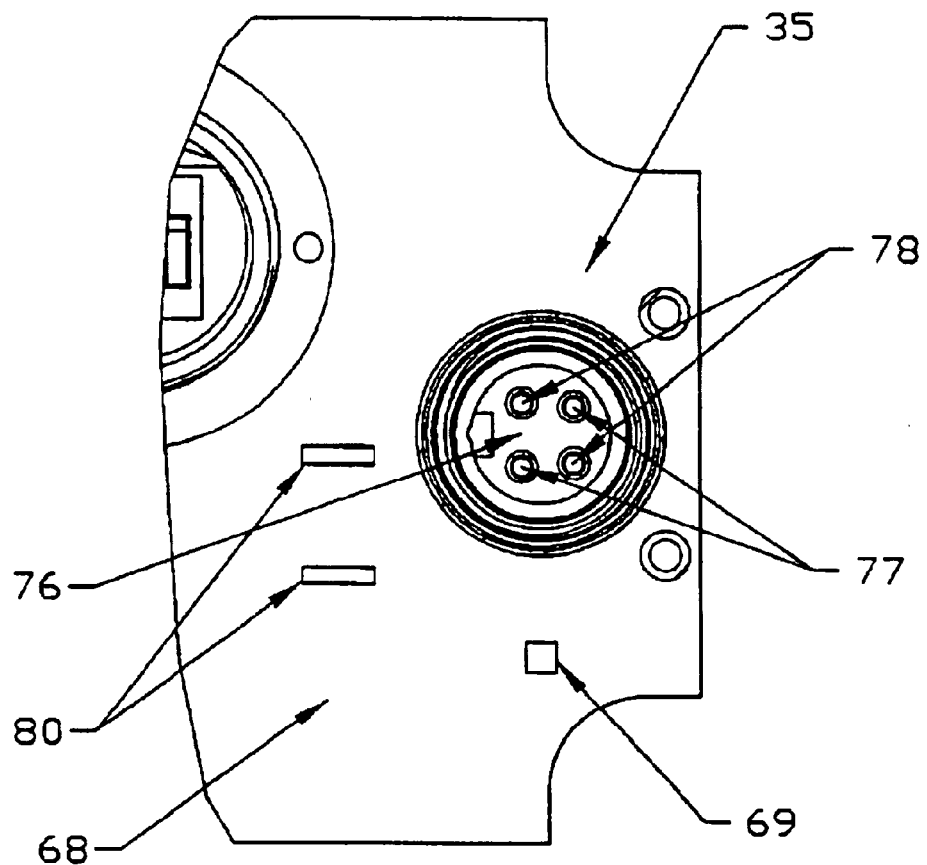
FIG. 12 is a top view of the industrial quick-disconnect connector mounted on a printed circuit board.
Figure 13:
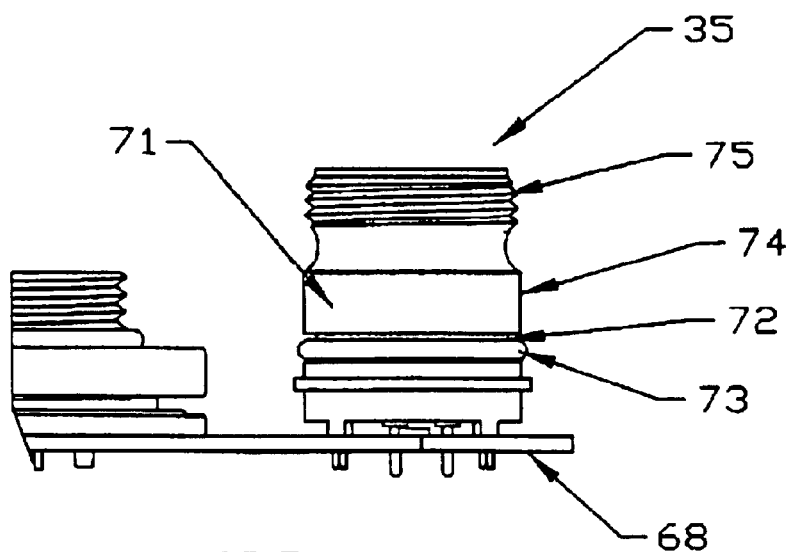
FIG. 13 is an elevational side view of the quick-disconnect connector of FIG. 12.

Also included in the switch housing 10, mounted on the pad 15 is a conventional quick-disconnect power connector generally designated 35 and seen in more detail in FIGS. 12 and 13.

Figure 9:
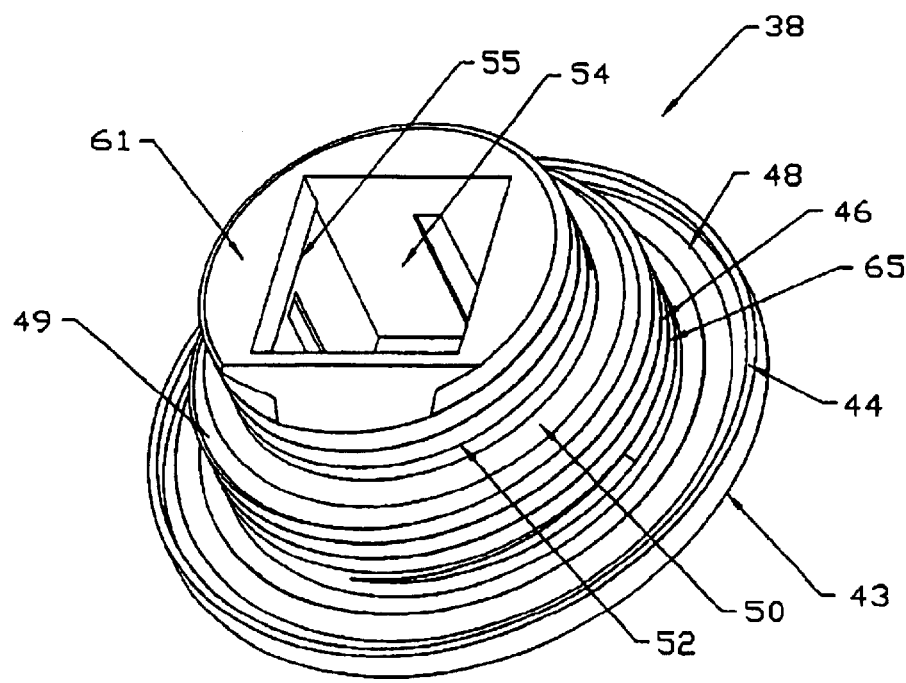
FIG. 9 is an upper frontal perspective of the connector receptacle of FIGS. 5–8.

Turning now to the industrial Ethernet connectors 23–30, each of these connectors is similar in structure, and only one need be described for a full understanding of the others. Referring first to FIG. 9, there is shown a perspective view of a protective connector receptacle generally designated 38. The connector receptacle 38 is generally circular in its outer periphery, and is molded of a rigid plastic, such as ABS, so that it provides a rugged, integral body resistant to external compressive forces, and forms an insulated protective case for a conventional RJ45 connector shown at 40 in FIGS. 3 and 4.

The connector receptacle 38 includes a peripheral flange 43 which provides a shoulder 44 for engaging the under surface of the top wall 21 of the center section 18 of the switch housing 10. The surface of the center section 18 includes eight circular apertures which receive the connector receptacles 38 for each of the connectors 23–30. Each connector receptacle 38 comprises an externally threaded portion 46 adjacent the peripheral flange 43 which fits through an associated aperture in the top of the center section 18 and is secured by an internally threaded nut or ring such as designated 107 in FIGS. 1 and 6. A first O-ring 47 is received in groove 48 and in shoulder 44 seals between the flange 43 and the upper wall of the center section of switch housing 10. The top of the cylindrical sidewall 46 is designated 49 in FIGS. 6 and 9; and adjacent the top 49 is an annular recess 50 which receives a second O-ring 51 which seals against a mating male industrial Ethernet connector, such as that shown in U.S. patent application Ser. No. 09/660,051, filed Sep. 12, 2000 for "Data Signal Connector with Protective Overmold", the subject matter of which is incorporated herein by reference. Above the O-ring 51 is an extension wall 52 which is externally threaded at 53 to receive a coupling nut of the mating male RJ45 connector.

Thus, the connector receptacle 38 is secured in the switch housing 10 by the lock nut or ring 107 as described; it is located relative to the switch housing by means of the shoulder 44 and sealed to the housing 10 by the O-ring 47. The threaded extension 52 extends above the upper surface 21 of the pad 15, as seen in FIG. 2; and O-ring 51 forms a seal between the connector receptacle 38 for the Ethernet connector and a conventional mating male Ethernet connector (not shown).

Alternatively, each receptacle could be press-fit into an aperture in the top wall of the housing and sealed against the side wall of its associated aperture by an o-ring received in a groove located where the threads 46 are shown.

Figure 7:
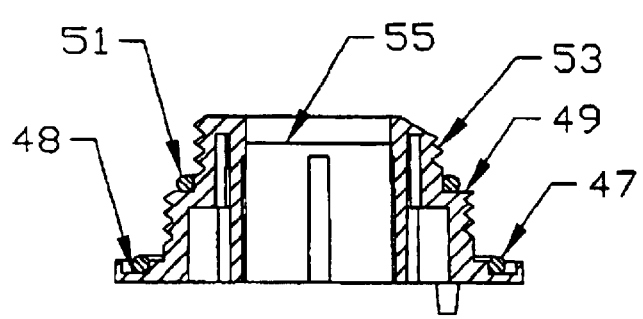
FIG. 7 is a cross-sectional view taken through the sight line 7—7 of FIG. 5.

Referring to FIGS. 5 and 9, the center of the connector receptacle 38 includes a generally rectangular central opening generally designated 54 for receiving the RJ45 connector 40. As seen in FIG. 7, on each side of the opening 54 there is a generally rectangular slot such as the one designated 55 in FIG. 7. The slots 55 receive the lateral protrusions or ears seen at 58 on the RJ45 connector 40, and the slots 55 act to position the connector 40 within the connector receptacle 38 and limit its insertion so that the face of the connector, designated 60 in FIG. 4, is substantially flush with the front top surface 61 of the connector receptacle 38.

Turning to FIGS. 3 and 4, the RJ45 connector typically is provided with a thin outer metallic sheathing not capable of resisting larger compressive forces, and which is primarily intended for the purpose of reducing radio frequency interference. Within the connector 40 are a plurality of connecting elements 63 (nine in number) which are laterally aligned to mate with corresponding connecting elements of a male RJ45 connector, as described above. The RJ45 female connector shown is thus described as an in-line data or signal connector.

Figure 8:
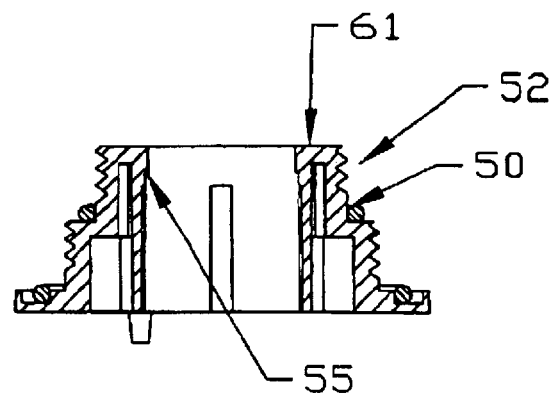
FIG. 8 is a cross-sectional view taken through the side line 8—8 of FIG. 5.

Further, the connector receptacle 38 provides a lower recess 65 at the base of the opening 54 in the connector housing and which is stepped, which is illustrated in FIGS. 8 and 9, for accommodating, locating and protecting the elements of the RJ45 connector received therein.

Turning now to FIGS. 12–13, the industrial quick-disconnect connector 35 is shown mounted on a printed circuit board 68 which is conventionally mounted or embedded by epoxy within the housing 10. In addition to the connector 35, a bi-color LED 69 if mounted on the board 68. When the LED 69 is illuminated in the color red, it indicates that DC power is not being supplied to the Ethernet switch due to a polarity reversal, and when the LED 69 is illuminated green, it indicates that DC power (24 v. DC) is being supplied to the Ethernet switch with proper polarity. The LED 69 is located on the upper surface of the pad 15 of the switch housing 10, adjacent the industrial quick-disconnect connector 35 (FIG.1.)

The industrial quick-disconnect connector 35 is commercially available under the trademark MINI-CHANGE® from Daniel Woodhead Company, Northbrook, Ill., and it includes an outer metallic sheath 71, which defines a peripheral groove 72 for receiving an O-ring 73 which seals against the cylindrical wall of a receiving aperture formed in the upper wall of the pad 15 of the housing 10. Sheath 71 also includes a cylindrical portion above the groove 72 and designated 74 for being press-fit into the upper wall 21 of the pad 15. The upper portion of the sheath 71 is externally threaded at 75. An insert 76 of non-conducting rigid plastic material is received within the sheath 71. A plurality (four) of connector elements, one pair of which is designated 77 and the other pair is designated 78, are mounted in the insulating insert 76. The connector elements 77 are for coupling primary power to the Ethernet switching hub and the local area network with which it is associated. The connector elements 78 are designated as auxiliary power connecting elements, as is known in the art. A pair of auxiliary power spades or connecting elements 80 may also be mounted on the printed circuit board 68, if desired.

Figure 10:
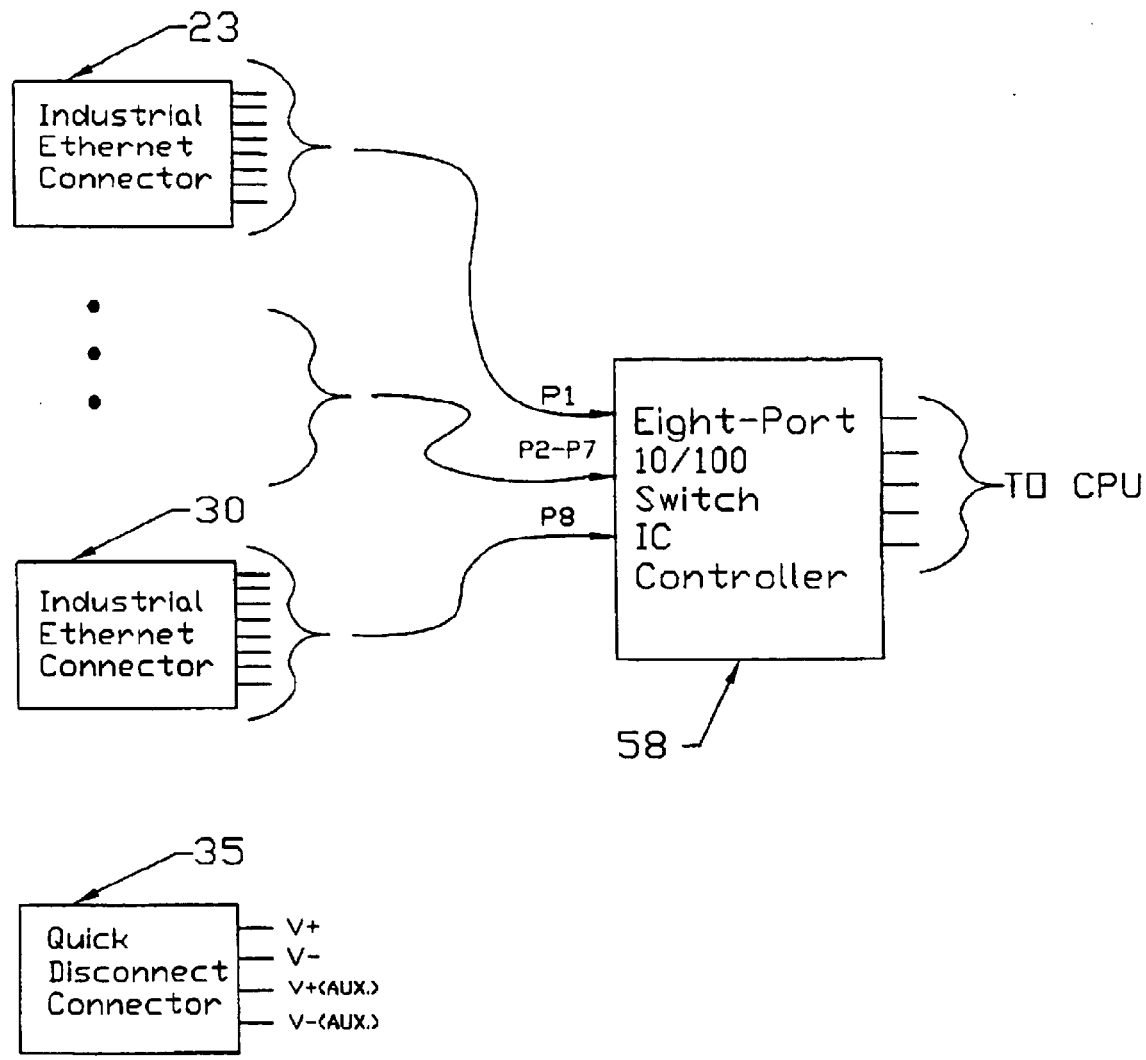
FIG. 10 is a functional block diagram of the electronic circuitry of the Ethernet switch shown in FIG. 1.

Turning now to FIG. 10, there is shown a functional block schematic diagram of the overall Ethernet switch control system. The individual industrial Ethernet connectors 23–30, as shown in FIG. 1, are similarly identified in FIG. 10. Each of the industrial Ethernet connectors 23–30 has nine leads (eight of which are data leads) coupled to input ports of a switch controller included within block 85. The leads of the quick-disconnect connector 35 are also coupled to the controller 85.

Figure 11:
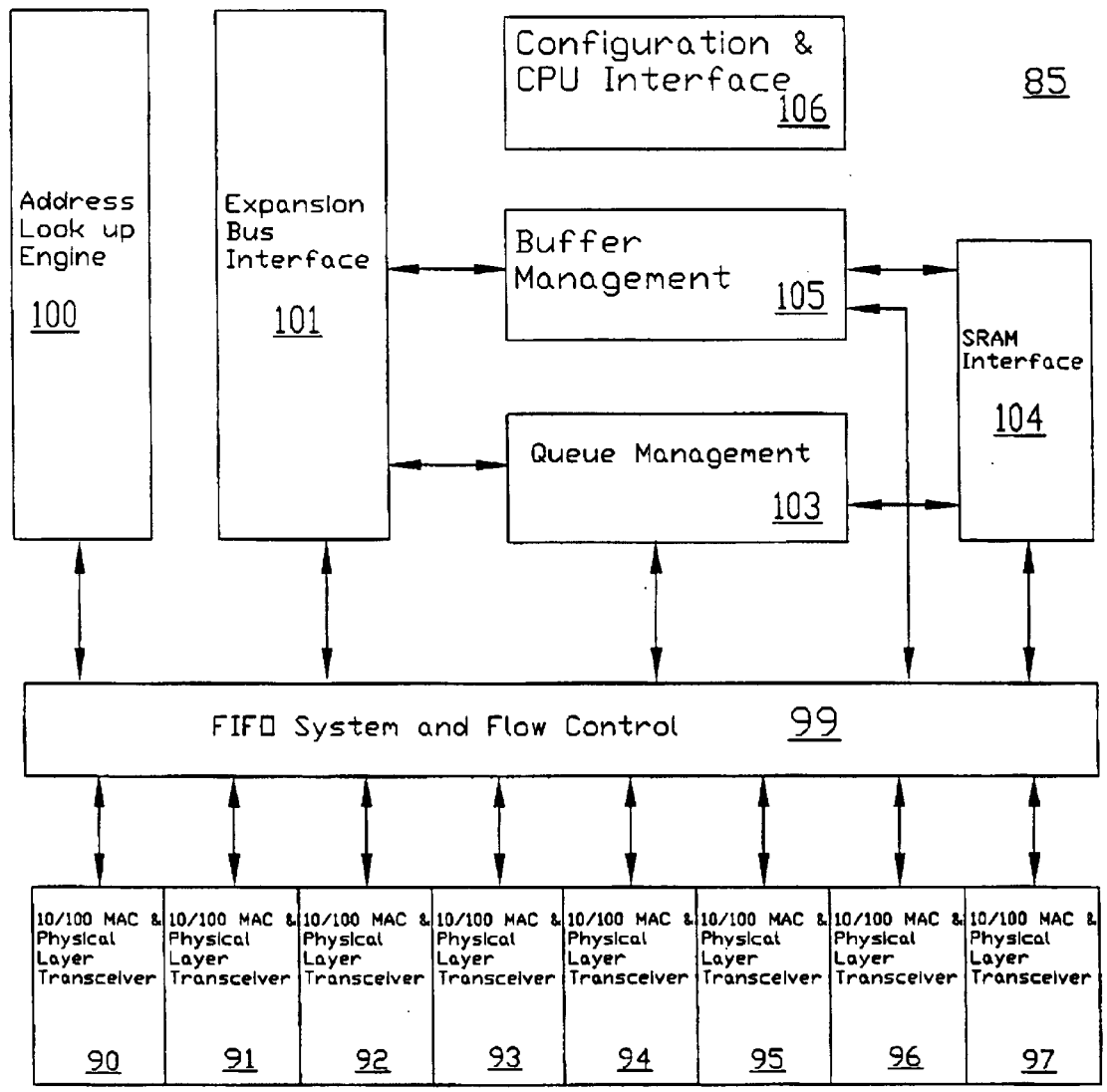
FIG. 11 is a functional block diagram of the Ethernet switch IC controller.

The controller 85 may be an Ethernet switch IC controller available as part KS8998, referred to as a 10/100 switch IC controller, available from Kendin Communications Inc. of Glendale, Calif. The controller 85 is an eight-port 10/100 switch IC controller capable of full duplex flow control meeting IEEE specification 802.3x. A functional block diagram of the switch controller 85 is seen in FIG. 11. The industrial Ethernet connecters 23–30, are connected respectively to transceivers 90–97. The output of the transceivers 90–97 are coupled to a FIFO system and flow control 99 which communicates, under microprocessor control, with an address lookup search engine 100, an expansion bus interface 101, which is optional, as well as Queue Management Control 103, the SRAM Interface 104, and buffer management control 105. The switch 100 manages data to and from the local area network through the interfaces provided by transceivers 90–97, and to and from other network hubs or backbone, which may be remotely located, through transceiver 97. According to the conventional design of the switch IC controller 85, it identifies the location of individual devices on the local area network and direct control messages through the proper output ports, while isolating collision domains, and it also receives input information from the devices being monitored, again avoiding collision domains, and routes that information back to the main CPU via Interface 106.

Having thus disclosed in detail an embodiment of the present invention, persons skilled in the art will be able to modify the structure described or substitute equivalent elements for those disclosed while continuing to practice the principle of the invention; and it is therefore, intended that all such modifications and substitutions be covered as they are embraced within the spirit and scope of the claims.

What is claimed is:

1. A switching hub for Ethernet network comprising:
   a casing including a top wall;
   a plurality of industrial connector assemblies mounted to said top wall and extending therethrough, each connector assembly including a receptacle of rigid non-conducting material defining an opening and an externally threaded extension extending exterior of said top wall of said casing, each receptacle further including a peripheral flange for engaging said top wall of said casing when said receptacle is assembled thereto, each receptacle of said connector assembly further including a side wall extending through an associated aperture in said top wall of said casing, a peripheral groove in said peripheral flange and a curved recess adjacent said side wall of said receptacle extending adjacent said externally threaded extension; and a first sealing ring in said peripheral groove of said peripheral flange for forming a seal between said receptacle and said top wall of said casing a second sealing ring in said curved recess for sealing with a coupling member of a mating connector;

an RJ45 connector received in said opening of said receptacle;

a quick disconnect connector including an outer threaded portion mounted to said top wall, an insert of rigid non-conducting material, and a plurality of connecting elements carried by said insert; and an Ethernet switch controller within said casing and including a transceiver circuit coupled to each of said plurality of RJ45 connectors.

2. The apparatus of claim 1 wherein said sidewall of said receptacle defines a second threaded portion extending through said top wall of said casing and located below said first-named threaded portion; and further including a threaded nut received on said second threaded portion to secure said receptacle to said casing.

3. The apparatus of claim 2 wherein said opening of said receptacle includes a generally rectangular cavity for receiving said RJ45 connector; and a pair of opposing recesses for receiving projecting ears of locating said Ethernet connectors relative to said receptacle.

4. The apparatus of claim 1 further comprising a printed circuit board within said casing, said quick disconnect connector including a plurality of connecting pins coupled with said circuit board.

5. A switching hub for Ethernet network comprising:

a casing including a wall;

a plurality of industrial connector assemblies mounted to said wall and extending therethrough, each connector assembly including a receptacle of rigid non-conducting material defining an opening and an externally threaded extension extending exterior of said wall of said casing;

an RJ45 connector received in said opening;

a sealing ring interposed between said receptacle and said wall of said casing;

a printed circuit board housed within said casing;

a quick disconnect connector including an outer threaded portion mounted to said wall, an insert of rigid non-conducting material, a plurality of connecting elements carried by said insert, and a plurality of connecting pins connected to said printed circuit board;

an Ethernet switch controller within said casing and including a transceiver circuit coupled to each of said plurality of RJ45 connectors; and an LED indicator for signaling a first color when applied power is of proper polarity and a second color when applied power is reversed in polarity.

6. The apparatus of claim 5 wherein said quick disconnect connector includes an exterior cylindrical wall defining a peripheral recess, said cylindrical wall extending through an aperture in an upper wall of a reduce portion of said casing, said apparatus further including a sealing ring in said peripheral recess of said quick disconnect connector.

7. A switching hub for Ethernet network comprising:

a casing including a top wall a surrounding sidewall, and a bottom wall for support;

a plurality of industrial connector assemblies mounted to a central portion of said top wall and extending therethrough, each connector assembly including a receptacle of rigid non-conducting material defining an opening, an externally threaded extension extending exterior of said wall of said casing, and an RJ45 connector received in said opening;

a sealing ring interposed between said receptacle and said top wall of said casing;

a quick disconnect connector mounted on a side portion of said casing, and including an outer threaded portion mounted to said side portion, an insert of rigid non-conducting material, and a plurality of connecting elements carried by said insert;

an Ethernet switch controller within said casing and including a transceiver circuit coupled to each of said plurality of RJ45 connectors; and an LED associated with and adjacent each of said connector assemblies, and adapted to signal the data transmission rate of its associated RJ45 connector.

* * * * *